(12) United States Patent
Tonnelier et al.

(10) Patent No.: US 11,190,072 B2
(45) Date of Patent: Nov. 30, 2021

(54) STATOR FOR HIGH SPEED ELECTRIC MACHINE HAVING PARTICULAR DIMENSIONS FOR HIGH SPEED OPERTATIONS

(71) Applicant: MOVING MAGNET TECHNOLOGIES, Besançon (FR)

(72) Inventors: Gilles Tonnelier, Ecole Valentin (FR); Gaël Andrieux, Evilard (CH); Jean Le Besnerais, Mons en Baroeul (FR); Quentin Souron, Lille (FR)

(73) Assignee: Moving Magnet Technologies, Besançon (FR)

( * ) Notice: Subject to any disclaimer, the term of this patent is extended or adjusted under 35 U.S.C. 154(b) by 35 days.

(21) Appl. No.: 16/461,229

(22) PCT Filed: Nov. 15, 2017

(86) PCT No.: PCT/FR2017/053128
§ 371 (c)(1),
(2) Date: May 15, 2019

(87) PCT Pub. No.: WO2018/091824
PCT Pub. Date: May 24, 2018

(65) Prior Publication Data
US 2019/0280545 A1    Sep. 12, 2019

(30) Foreign Application Priority Data

Nov. 16, 2016 (FR) ...................................... 1661084

(51) Int. Cl.
*H02K 3/20* (2006.01)
*H02K 1/14* (2006.01)
*H02K 29/03* (2006.01)

(52) U.S. Cl.
CPC ............... *H02K 3/20* (2013.01); *H02K 1/146* (2013.01); *H02K 29/03* (2013.01); *H02K 2213/03* (2013.01)

(58) Field of Classification Search
CPC .... H02K 1/14; H02K 1/146; H02K 3/20; H02K 29/03; H02K 2213/03
(Continued)

(56) References Cited

U.S. PATENT DOCUMENTS 6,777,842 B2   8/2004 Horst
9,054,767 B2   6/2015 Razaviyayn et al.
(Continued)

FOREIGN PATENT DOCUMENTS

DE    19960088 A1    3/2001

OTHER PUBLICATIONS

Hesmondhalgh, D. E. et al., "Design and constructions of a high-speed high performance direct-drive handpiece," IEE Proceedings, vol. 134, No. 6, Nov. 1987, pp. 286-296.
(Continued)

*Primary Examiner* — Tulsidas C Patel
*Assistant Examiner* — Rashad H Johnson
(74) *Attorney, Agent, or Firm* — Harness, Dickey & Pierce, PLC

(57) ABSTRACT

The disclosure relates to a high-speed electric machine, having a speed higher than 20,000 rpm, including a rotor having 1 or 2 pairs of magnetized poles, and an enhanced stator which has an outer diameter that is larger than 18 millimeters and which has 3 or 6 straight teeth extending radially and borne by a one-piece peripheral annular collar. At least a portion of the teeth bear coils, and the teeth are rigidly connected to one another and together form a one-piece planar assembly. The coiled teeth have a rectangular cross-section of width I and of length L, with formula (I).

3 Claims, 3 Drawing Sheets

(58) Field of Classification Search
USPC .................. 310/51, 156.66, 156.69, 156.71
See application file for complete search history.

(56) References Cited

U.S. PATENT DOCUMENTS

| | | | |
|---|---|---|---|
| 10,050,784 B2 | 8/2018 | Coleridge et al. | |
| 10,164,486 B2 | 12/2018 | Hyppias et al. | |
| 2011/0080066 A1* | 4/2011 | Doi ..................... | H02K 1/278 |
| | | | 310/156.43 |
| 2012/0098378 A1* | 4/2012 | Takemoto ............. | H02K 21/16 |
| | | | 310/156.53 |
| 2013/0106254 A1* | 5/2013 | Qi ....................... | H02K 1/146 |
| | | | 310/68 B |
| 2014/0049124 A1* | 2/2014 | Gandhi ................ | H02K 15/03 |
| | | | 310/46 |
| 2014/0203681 A1* | 7/2014 | Xiang .................. | H02K 3/50 |
| | | | 310/216.111 |
| 2015/0263572 A1* | 9/2015 | Hyppias ............... | H02K 29/03 |
| | | | 310/83 |
| 2016/0233734 A1 | 8/2016 | Biwersi et al. | |
| 2017/0093248 A1* | 3/2017 | Li ........................ | H02K 1/146 |
| 2017/0093249 A1* | 3/2017 | Li ........................ | B60L 1/003 |
| 2017/0141670 A1 | 5/2017 | Hyppias et al. | |
| 2017/0222528 A1* | 8/2017 | Tsuchida ............. | H02K 21/16 |
| 2018/0076686 A1 | 3/2018 | Machet et al. | |

OTHER PUBLICATIONS

Gradinaru, V. et al., "Hybrid analytical/FEM optimization design of SPMSM for refridgerator compressor loads," Acemp—Electromotion 2011, Sep. 8, 2011, pp. 657-662.
Duane C. Hanselman, Brushless Permanent-Magnet Motor Design, 106-08, Fig. 5-3 (1994).

* cited by examiner

STATOR FOR HIGH SPEED ELECTRIC MACHINE HAVING PARTICULAR DIMENSIONS FOR HIGH SPEED OPERTATIONS

CROSS-REFERENCE TO RELATED APPLICATIONS

This application is a National Phase Entry of International Patent Application No. PCT/FR2017/053128, filed on Nov. 15, 2017, which claims priority to French Patent Application No. 16/61084, filed on Nov. 16, 2016, both of which are incorporated by reference herein.

TECHNICAL FIELD

The invention refers to rotating electrical machines and more particularly to those rotating at high speed, i.e. at speeds exceeding 20,000 rpm (20 000 RPM). More precisely, this invention proposes a stator for such a high-speed machine that allows operation while advantageously minimizing vibrations and noise emissions of the electric machine. The applications targeted by the invention are typically, but not exclusively: air pump, gas suction in a motor vehicle, vacuum cleaner, turbocharger, respirator, generator.

BACKGROUND

From the prior art, different solutions for minimizing noise emissions of rotating electrical machines are known. For example, document JP200634008 proposes a solution consisting in separating the stator into several independent blocks, which allows a resonance frequency induced by the use of a monobloc stator to be avoided. Indeed, this last solution is generally penalized by the resonance modes of the stator, which behaves like a ring. If this physical separation solution can be effective, it however requires a relatively complex construction with a high degree of control of positioning tolerance.

Document WO2016079449 proposes the use of cavities on the back of the stator to promote a string effect that dampens the acoustic waves created in the motor. It also proposes the previous technique of separating the stator into several blocks. As before, this solution can be effective, but it requires a relatively complex construction with a high degree of control of positioning tolerance. It also requires an external housing to hold the stator.

U.S. Pat. No. 6,777,842 proposes to add magnets to the rotor to counter the protrusion effects of the machine. This solution involves a larger magnet mass and is only used to counter motor noise. The overall performance of the motor is also impacted by these additional magnets.

Also, document DE19960088 proposes another solution to the person skilled in the art: the addition of a ring or outer housing with an elastomeric damping material. This solution therefore requires the addition of one or two additional parts to the stator. The fine adjustment of the thickness, physical qualities and positioning of this elastomeric material remains quite difficult.

Finally, document WO2013044824 proposes a solution for encapsulating the electric motor in a housing comprising inner and outer envelopes. This solution, which is probably effective in limiting noise emitted by the motor, requires additional parts, complex construction and unfavourable space requirements. These prior art devices, which aim to limit the propagation of noise caused by the rotating electrical machine, all have disadvantages, whether by adding additional construction elements to the stator, making the construction of the machine more complex and more costly, or by multi-block constructions that makes the overall construction and tolerance control more complex.

SUMMARY

The present invention aims to overcome the disadvantages of the state of the art by proposing a stator for monobloc rotating electric machines, the relative dimensions of which are original in relation to the prior art. One of the purposes of the invention is to allow the minimization of noise emissions from electrical machines running at speeds above 20,000 rpm and having external diameters above 18 mm, a size assessed as critical, below which high structural rigidities do not produce detrimental noise emissions. Due to the specified high speed character, the invention is limited to the use of electric machines, typically three-phase with a number of pairs of poles magnetized to the rotor limited to 1 or 2 and a number of stator teeth limited to 3 or 6.

More particularly, the invention concerns an electric machine (motor or generator) with a high speed, greater than 20,000 rpm, comprising a rotor having 1 or 2 pairs of magnetized poles and an improved stator with an external diameter greater than 18 mm having 3 or 6 straight teeth extending radially and supported by a monobloc peripheral annular collar, at least a part of the teeth carrying coils, said teeth being integral with each other and forming a monobloc planar unit between them, characterized in that the wound teeth have a rectangular section of width I and length L, such that $$\frac{I}{L^2} \geq 20,$$

expressed in SI units, to push the resonance frequency of each tooth beyond the audible spectrum, typically >16 kHz. Preferably, said peripheral collar has a thickness (ep) and a diameter (dext) such that $$\frac{1220\sqrt{-\sqrt{25 - \frac{131ep^2}{(dext-ep)^2}} - \frac{8ep^2}{(dext-ep)^2} + 5}}{dext-ep} \geq 16000,$$

expressed in SI units.

In a particular embodiment, the teeth are linked together by the said peripheral collar and are equipped with 3 coils and 6 teeth, one tooth out of two carrying a coil. The rationale and interest of these claimed characteristics are explained in the description of the figures that allow a better understanding of the invention.

BRIEF DESCRIPTION OF THE FIGURES

Other characteristics and advantages of the invention will appear in the description that follows relative to detailed embodiments, and referring to the attached figures that represent respectively.

DETAILED DESCRIPTION OF ONE EMBODIMENT

Figure 1:
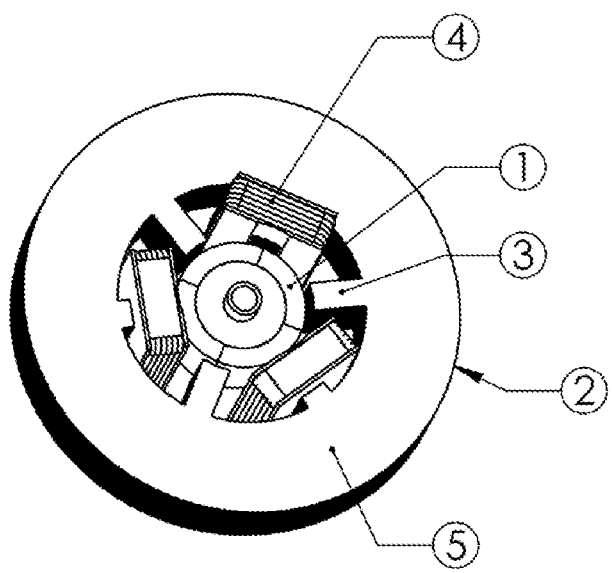
FIG. 1, a perspective view of an electric machine according to a first embodiment of the invention.

FIG. 1 represents a perspective view of an electric machine according to a first embodiment of the invention. The machine comprises a rotor (1) with 2 pairs of magnetized poles, an improved stator (2) with 6 straight teeth (3) and without polar blossoming, allowing the insertion of coils (4), made outside the motor, from the inside of the improved stator (2). These teeth (3) form a monobloc unit and are linked by a monobloc collar (5). The teeth (3) are equipped with 3 coils (4). As shown in FIG. 1, one tooth (3) out of two bears a coil (4), but this is not limiting, nor the number of pole pairs. In general, it will be advantageous to make the improved stator (2) by stacking sheets (e.g. of Iron and Silicon alloy) but it can also be considered to make the improved stator (2) in a one-piece part, for example from a Somaloy SMC type material or an amorphous material.

Figure 2:
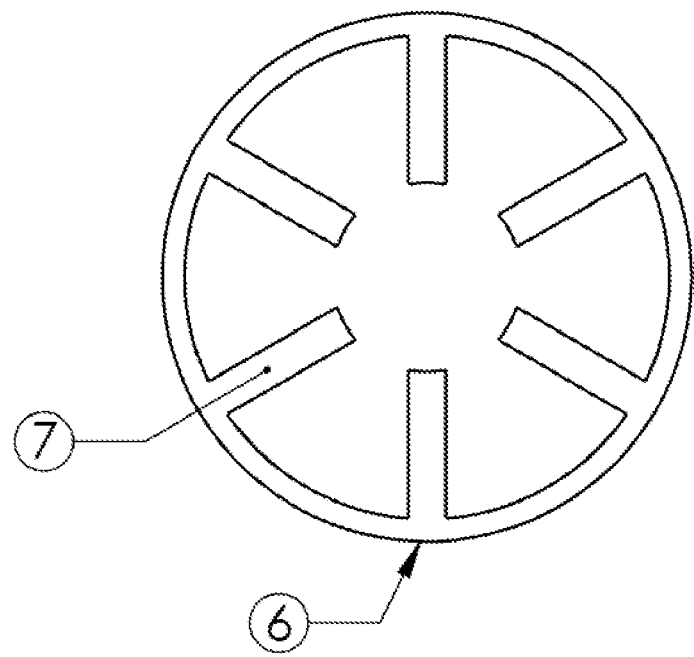
FIG. 2, an isolated front view of an electric machine stator from the prior art.

FIG. 2 shows a cross-sectional view of a stator according to the prior art with 6 long straight teeth (7). This embodiment is for example such as proposed by document FR2945388. This structure is magnetically optimized in that the magnetic flux circulation sections of the magnetic collar (6) are designed to avoid magnetic saturation of the sheets while minimizing space requirements. Similarly, the length of the teeth (7) is optimized to maximize the useful volume for the coils (not shown) inserted on these teeth (7) while limiting space requirements. These characteristics are obvious to the skilled person: a small radial thickness of the magnetic collar (6) and relatively long teeth (7) compared to this thickness.

However, the application of such teachings leads to nuisances when used for a machine running at high speed (typically >20,000 rpm). Indeed, the structure thus dimensioned is flexible and sensitive to the magnetic excitation forces generated by the interaction between the poles magnetized to the rotor (not shown here) and the improved stator (2). Magnetic forces induce two problems:

- the collar (6) which connects the teeth being thin and flexible, it is subject to a bending (mainly radial) which will excite the different natural modes of the ring thus created by the collar (6) of the improved stator (2), in low frequencies below the maximum speed of the motor,
- the teeth (7), being long, are subject to bending (mainly tangential) the amplitude of which can be significant, by mechanical resonance, in frequencies lower than those generated magnetically by the rotation of the rotor.

The frequencies generated magnetically by the rotation of the rotor depend on the number N of pairs of magnetized poles. For example, with N=2, as shown in FIG. 1, there are four magnet alternations and therefore four force alternations applying to the teeth (3) of the improved stator (2).

This alternating force, considering the harmonics contained, constitutes the source of frequency excitation of the teeth (3). The invention is thus limited to a number of pole pairs less than or equal to two. A higher number induces higher excitation frequencies that are less detrimental to the machine's noise emissions.

Regardless of the number of pairs of poles at the rotor (1), excitation harmonics, even of low energy amplitude, can cause forced vibrations that excite teeth and collar up to frequencies of 16 to 18 kHz, frequencies audible by humans and perceived as a nuisance. The collar (6) and teeth (7) are therefore likely to resonate and cause significant oscillations, which will generate noise.

Figure 3:
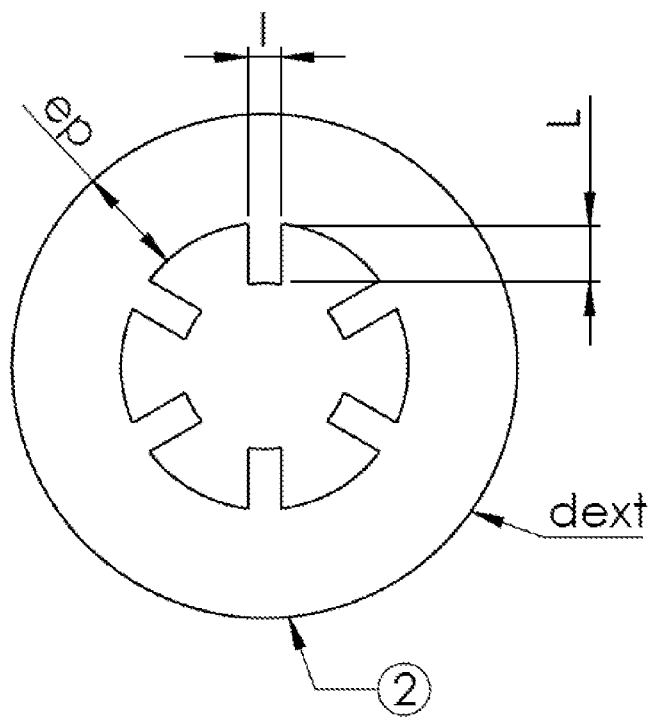
FIG. 3, an isolated face view of the stator of the device in FIG. 1.

FIG. 3 shows a cross-sectional view of a stator according to the invention. It defines design parameters such as the stator's outer diameter (dext), the collar thickness (ep) of the improved stator (2), the tooth width (I) and the tooth length (L). The improved stator (2) is designed so that the dynamic behaviour (torque/speed law) of the electric machine is similar to that of a machine using a stator similar to that shown in FIG. 2.

Surprisingly, it has indeed been observed that choices not obvious to the skilled person have been shown not to penalize the dynamics of the machine (torque/speed law) while allowing a significant improvement in noise emission during operation. These choices, the thickening of the magnetic passage sections, which is not useful when only magnetic saturation is considered, as well as the short length of the teeth, which a priori penalize the admissible coil volume, have eventually proved interesting on these two criteria of dynamics and sound emission. These design choices, not proposed by the prior art, allow the sensitive frequencies (resonance modes) of the structure—collar (5) and teeth (3)—to be pushed back into a frequency band acceptable to the human ear (higher than 16 kHz) and the amplitudes of deformations to be reduced to a sound level tolerable by the human ear. The length L and width I of the teeth are chosen so as to respect the relationship $$\frac{I}{L^2} \geq 20,$$

in order to push the resonance frequency of each tooth beyond the audible spectrum, typically ≥16 kHz.

Figure 4:
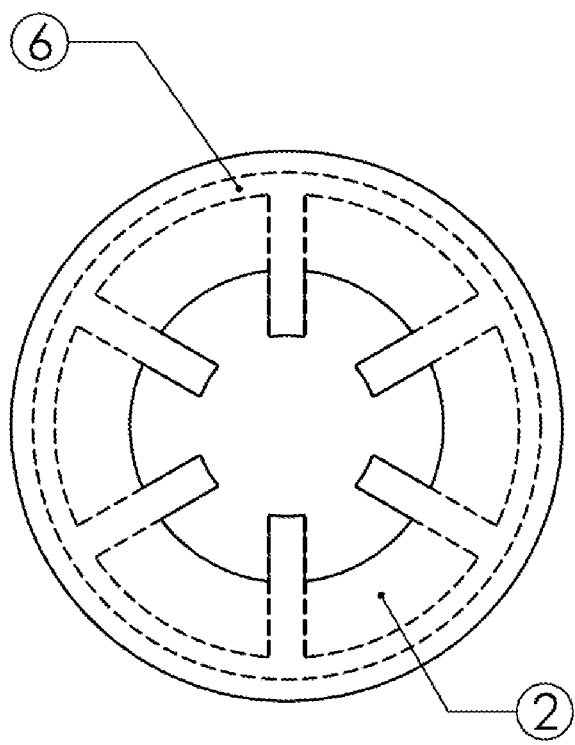
FIG. 4, a face view compared to the stators of the devices in FIGS. 2 and 3.
Figure 6:
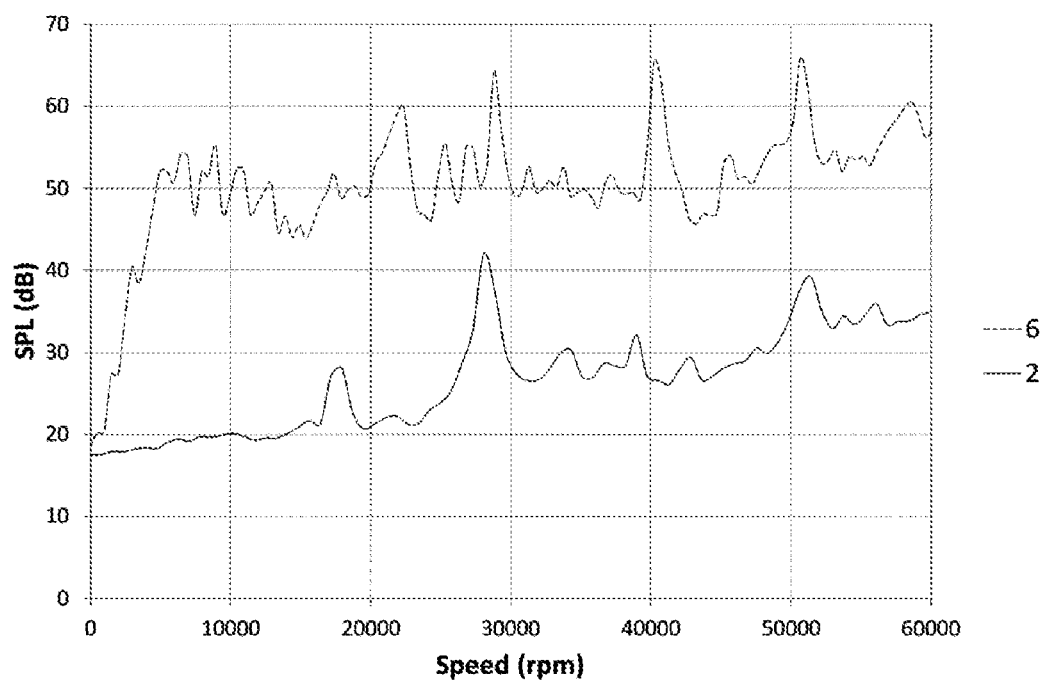
FIG. 6, a graph comparing the acoustic emissions of an electric machine of the prior art and an electric machine according to the invention.

FIG. 4 represents the geometric comparison between a stator from the prior art (6) and a stator according to the invention (2). The result is surprising for the skilled person who wants to size an electric machine and who is looking to have a thin magnetic collar to minimize losses related to field variation in the stator iron and maximize the amount of copper in the coils. Indeed, the acoustic performance generated by the use of the improved stator (2) is very significantly improved compared to the use of the prior art stator (6) as shown in FIG. 6, while the dynamic properties of the structure are substantially equivalent. Due in particular to the fact that the quantity of iron present in the collar (5) of the improved stator (2) is greater than that in the stator collar (8) of the prior art (6), the average flux density is very significantly reduced and the iron losses (by hysteresis and eddy currents) are also reduced. This compensates for the loss of coil volume.

These new design rules thus make it possible, in a surprising way, to produce an electric machine whose dynamic performances is similar to those of prior art machines while minimizing noise emissions during operation. This makes it possible to produce the improved stator (2) in a continuous monobloc assembly if we consider each sheet of the improved stator (2)—in the case of manufacturing in sheet stacks—or if we consider a solid assembly—in the case of manufacturing with an amorphous type material.

Figure 5:
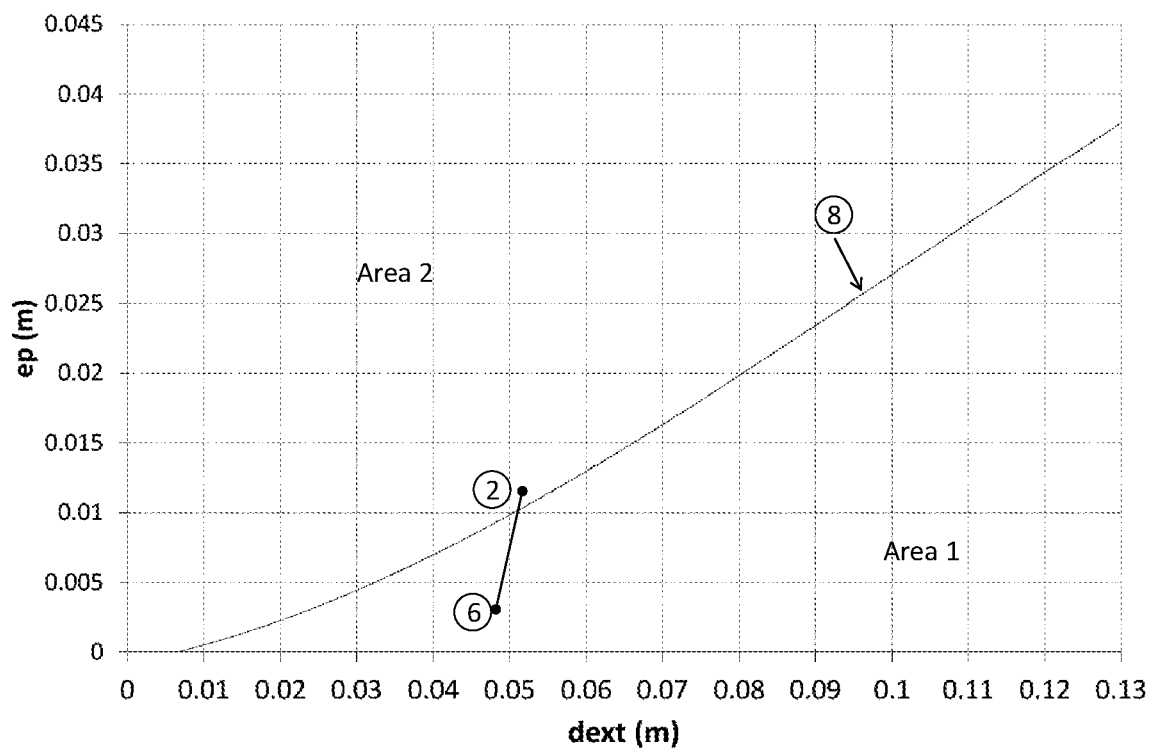
FIG. 5, a graph showing the evolution of the stator collar thickness as a function of the external diameter of the stator of an electric machine.

FIG. 5 shows a graph illustrating a curve (8) linking the thickness of the stator collar (ep) to the stator outer diameter (dext). A design area (Area 1) is defined below the curve (8) and another area (Area 2) is defined above the curve (8). The curve (8) is an iso frequency curve at 16 kHz. Any point above this curve (8) corresponds to a machine of acceptable size with resonance modes (ring modes) greater than 16 kHz. The expression of acceptable (ep) and (dext) parameters is related to the 16 kHz frequency by the relationship:

$$\frac{1220\sqrt{-\sqrt{25-\frac{131ep^2}{(dext-ep)^2}-\frac{8ep^2}{(dext-ep)^2}}+5}}{dext-ep} \geq 16000$$

Any point below this curve (8) corresponds to a machine whose resonance modes (ring modes) are less than 16 kHz. The choice of 16 kHz is related to a minimum permissible lower limit. Thus, to size a machine whose ring mode is acoustically optimized, it is necessary to choose a torque (ep), (dext) located above the curve (8). An example of acoustic improvement is represented by passing from the prior art electric machine having a state-of-the-art stator (6) to an electric machine, the object of the invention, having an improved stator (2) with substantially identical dynamic performances. The electric machine with an improved stator (2) thus has improved acoustic performances compared to the electric machine with a stator (6) of the prior art. This is better visualized in FIG. 6.

FIG. 6 shows the evolution of the measured sound level (SPL) at a distance of 1 m from two electric machines, in motor mode, with an improved stator (2) and a prior art stator (6), as a function of the motor rotation speed (rpm). These two motors were selected so that both associated motors have equivalent dynamic performances and these were acoustically measured during acceleration and then maintaining a stabilized speed. There has been a significant improvement in terms of acoustic emission, since the improvement exceeds 20 dB.

The invention claimed is:

1. A high-speed electric machine comprising:
a rotor including one or two pairs of magnetized poles;
an improved stator with an external diameter (dext) of more than 18 millimeters and including three or six radially extending straight teeth supported by a monobloc peripheral annular collar;
at least a part of the teeth carrying coils, the teeth being integral with each other and forming a monobloc planar unit between them;
the teeth including a rectangular section of width I and length L, with $$\frac{I}{L^2} \geq 20;$$

the peripheral annular collar having a thickness (ep) and the external diameter (dext) such that $$\frac{1220\sqrt{-\sqrt{25-\frac{131ep^2}{(dext-ep)^2}-\frac{8ep^2}{(dext-ep)^2}}+5}}{dext-ep} \geq 16000,$$

wherein the thickness (ep) and the external diameter (dext) have non-negative, real values; and
the electric machine having a rotation speed of more than 20,000 revolutions per minute.

2. The high-speed electric machine according to claim 1, wherein the teeth are connected to each other by the peripheral annular collar and are equipped with three coils and six teeth, one tooth out of two carrying a coil.

3. A high-speed electric machine comprising:
a rotor;
a stator comprising:
a monobloc peripheral annular collar having a thickness (ep) and an external diameter (dext) such that $$\frac{1220\sqrt{-\sqrt{25-\frac{131ep^2}{(dext-ep)^2}-\frac{8ep^2}{(dext-ep)^2}}+5}}{dext-ep} \geq 16000,$$

wherein the external diameter (dext) is greater than 18 millimeters, and wherein the thickness (ep) and the external diameter (dext) have non-negative, real values; and
a plurality of straight teeth extending radially from the annular collar, the teeth including a rectangular section of width I and length L, with $$\frac{I}{L^2} \geq 20,$$

wherein the teeth have equal widths; and
a plurality of coils;
the electric machine having a rotation speed of more than 20,000 revolutions per minute.

* * * * *